(12) United States Patent
Gador et al.

(10) Patent No.: US 8,756,526 B2
(45) Date of Patent: Jun. 17, 2014

(54) WIZARD IN A WIZARD ENGINE

(75) Inventors: Robin Gador, Tumba (SE); Ingela Krantz, Varmdo (SE); Jan Pontusson, Jarfalla (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 233 days.

(21) Appl. No.: 12/997,304

(22) PCT Filed: Sep. 15, 2008

(86) PCT No.: PCT/SE2008/000514
§ 371 (c)(1),
(2), (4) Date: Dec. 10, 2010

(87) PCT Pub. No.: WO2009/151354
PCT Pub. Date: Dec. 17, 2009

(65) Prior Publication Data
US 2011/0093779 A1    Apr. 21, 2011

(30) Foreign Application Priority Data
Jun. 13, 2008  (SE) .................................... 0801385

(51) Int. Cl.
*G06F 3/048* (2013.01)

(52) U.S. Cl.
USPC ............ 715/804; 715/201; 715/708; 715/749

(58) Field of Classification Search
USPC .................................................. 715/708, 804
See application file for complete search history.

(56) References Cited

U.S. PATENT DOCUMENTS

| | | | |
|---|---|---|---|
| 6,343,360 B1 * | 1/2002 | Feinleib | 713/1 |
| 6,597,381 B1 * | 7/2003 | Eskridge et al. | 715/804 |
| 6,774,921 B1 | 8/2004 | Tadman et al. | |
| 7,213,212 B2 * | 5/2007 | Bybee et a | 715/760 |
| 7,240,295 B2 * | 7/2007 | Bybee et al. | 715/788 |
| 7,290,215 B2 * | 10/2007 | Bybee et al. | 715/760 |
| 7,440,995 B2 * | 10/2008 | Morgan, III | 709/203 |
| 7,802,229 B2 * | 9/2010 | Kornerup et al. | 717/109 |
| 7,856,601 B2 * | 12/2010 | Moore et al. | 715/809 |
| 2003/0043187 A1 | 3/2003 | Li | |
| 2004/0135802 A1 | 7/2004 | Allor | |
| 2005/0050438 A1 * | 3/2005 | Cheung et al. | 715/500 |
| 2005/0114266 A1 * | 5/2005 | Satkunanathan et al. | 705/59 |
| 2006/0026501 A1 * | 2/2006 | Anthony et al. | 715/509 |
| 2006/0112123 A1 * | 5/2006 | Clark et al. | 707/101 |
| 2007/0028160 A1 | 2/2007 | Argo et al. | |
| 2008/0244398 A1 * | 10/2008 | Santos-Gomez et al. | 715/708 |

* cited by examiner

*Primary Examiner* — William Titcomb
(74) *Attorney, Agent, or Firm* — Coats & Bennett, P.L.L.C.

(57) ABSTRACT

A method for managing a web application initiated by a user is disclosed which enables navigation between two or more wizards while executing said web application. Predefined instructions ensure that a user can execute a plurality of steps in different orders when navigating between two or more wizards without losing any data that has been executed in a previous step. A wizard engine is also disclosed which is adapted to execute the suggested method.

21 Claims, 8 Drawing Sheets

WIZARD IN A WIZARD ENGINE

TECHNICAL FIELD

The present invention relates to a method and a wizard engine which allows a user to complete an execution of a web application in a user friendly way by enabling navigation between different wizards in an optional order.

BACKGROUND

A steadily increasing number of administrative tasks covering a wide range of areas may be executed via software related applications, typically referred to as web applications. A number of such web applications, accessible via the Internet and any kind of conventional web browser do, however, require lengthy interactive processes which may be both time consuming and complex to complete. Infrequently performed tasks where the user is unfamiliar with the steps involved may also raise a demand for a simplified user interface and a simplified mechanism for executing one or more user interactions for executing the application. In order to simplify such operations user interface elements, commonly referred to as wizards, have been introduced. When executing an application comprising one or more wizards, the user is presented with a sequence of dialog boxes, through which the user is led through a series of steps, enabling the user to perform a number of required tasks in a specific sequence.

A situation may, however, occur where data configured in one wizard need to be used in another wizard. A problem that typically may occur in this type of situations is when a user about to complete a task, such as e.g. a configuration, via some web application has to quit one wizard in order to continue, since it contains data that has to be configured in another wizard, and this has not been correctly done, since the different wizards have to be configured in a specific order. Such an exemplary procedure is described below with reference to FIGS. 1a-c.

An illustrative example of such a scenario will now be presented with reference to FIG. 1a, where an operator completing a configuration is about to enter data into a form 100 of a wizard, wizard A, comprising a number of data fields 101-104. Data field 104 is a field for entering the created user's mailbox. In this case, however, no mailbox has been created as yet for this user, and, in order to be able to complete the configuration the operator will first have to quit wizard A, and call another input form 105 of another wizard, wizard B, illustrated with FIG. 1b, which comprises the relevant form for continuing the configuration process by configuring a mailbox for the user.

The operator continues the configuration procedure by entering data into input form 105, starting with data fields 106a and finishing with a final input data field 106n of wizard B. Once the configuration is completed, the operator submits the entered data by pressing an "Apply" button 107. With an existing mailbox for the created user, the operator can now choose to continue the configuration of the new user, which was started with entering data into the form associated with wizard A. However, since the state and all data entered to the input form of wizard A was lost when leaving wizard A, the operator will have to start to enter all data settings which were relevant for wizard A all over again, after having returned to this wizard.

Even if such a procedure is doable, it is not very user-friendly. Apart from being time consuming, due to the user having to repeat the entering of data, which can result in a considerable amount of data that has to be entered once again into the data fields of wizard A. In addition, the fact that the same data has to be entered into different data fields of two, or possibly even more, wizards also increases the risk of erroneously entered data.

SUMMARY

It is an object of the present invention to overcome at least some of the deficiencies mentioned above. This is achieved by introducing a method which enables a user to easily navigate between wizards when executing a web application, without having to have any particular knowledge about the interrelationship between interrelated data fields which are presented to the user via different wizards.

According to one aspect of the described wizard navigating mechanism a method for managing a web application initiated by a user by interacting via a first wizard, is provided. The method is suitable for handling web applications which involves two or more wizards, i.e. in order to execute the relevant tasks of an application, the user has to navigate between two or more different wizards. The suggested method comprises the following steps:
   a) interrupting a presently activated wizard and storing data associated with the activated wizard, upon recognising a request to access data that is missing at the present wizard but which is accessible from another wizard,
   b) invoking the other wizard, enabling the user to continue execution of the web application on the invoked wizard,
   c) interrupting the presently activated wizard, upon recognising a request to resume an interrupted wizard,
   d) resuming the stored data associated with the interrupted wizard, and
   e) resuming the interrupted wizard, thereby enabling the user to resume execution of the web application on the interrupted wizard from where it was interrupted.

The method also enables a user to repeat the described invoking of another wizard as many times as required during execution of a web application.

In association with resuming an interrupted wizard data entered to an activated wizard can be stored, either temporarily into a data structure, or permanently into one or more databases, thereby enabling dependent data processed in different wizards to be correctly updated.

Whether data should be stored in a data structure or in a database typically appears to the user as one available option only on the respective input form.

A request to invoke or resume a wizard typically comprises information for customizing the appearance of the requested wizard, e.g. for presenting appropriate options on the requested wizard.

According to another aspect, also a wizard engine adapted to execute the suggested method is provided.

The wizard engine is typically adapted to manage navigation between wizards on the basis of a dynamic web page. Rules specifying how to navigate between wizards may also be configured as predefined HTML tags.

By implementing the suggested wizard navigation mechanism, editing web pages which requires a user to visit two or more wizards will be simplified considerably, compared to presently available alternative solutions. The more wizards that are involved, the more can a user benefit from not having to care about in which order different tasks has to be executed.

The suggested mechanism also diminish the risk of entering incorrect data when the same information is required in different wizards, since the same data only has to be entered once.

BRIEF DESCRIPTION OF THE DRAWINGS

The present invention will now be described in more detail by means of exemplary embodiments and with reference to the accompanying drawings, in which.

DETAILED DESCRIPTION

Embodiments herein include a method that allows a user to halt an ongoing web application, such as e.g. a configuration procedure, after the user has started to enter data into a first wizard, to call a second wizard from the first wizard, and to continue to execute the application by entering data into the second wizard, before resuming the first wizard from where it was interrupted in the first place, in order to complete the initiated task of the web application. The method also enables interruptions of ongoing wizards to be repeated an arbitrary number of times, without the user having to risk any amended data, or having to consider in which order the different wizards have been interrupted and invoked, respectively, when returning to the interrupted wizard/s to complete the initiated web application. In addition, one or more embodiments of the teachings disclosed herein include a wizard engine, adapted to perform the method.

The invocation of another wizard is typically performed by displaying a button on the input form of a present wizard, allowing the user to launch another web page, containing another wizard's input form, simply by clicking on the respective button. The button is typically located next to the one or more data fields that represent data that has to be configured in either one or more other wizard/s.

If resuming to the previously described example, illustrated above with reference to FIGS. 1a-c, FIGS. 2a-c illustrates an alternative configuration procedure, which may be executed by using a suggested wizard processing method.

It is to be understood that although the following examples in this document refers to configuration procedures, the suggested wizard processing or navigating mechanism is applicable to any type of web application requiring a user interaction, that involves interaction with two or more wizards.

Figure 2A:
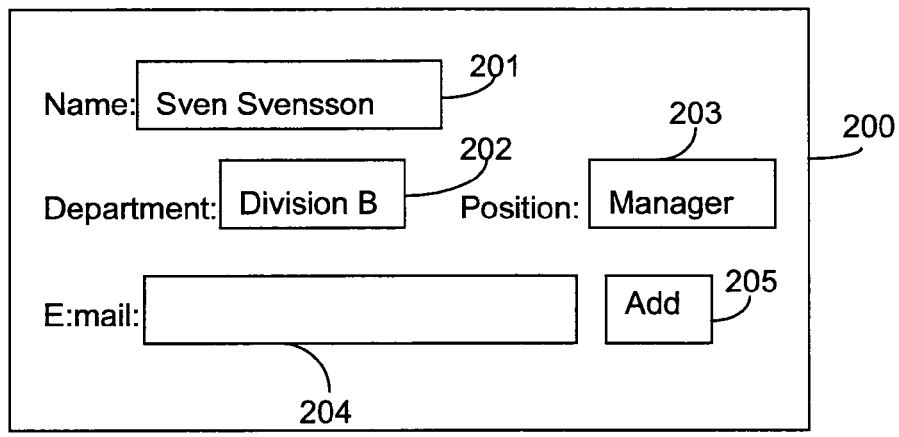
FIG. 2a-c illustrates a simplified configuration example involving two wizards, according to one embodiment of the invention.

FIG. 2a illustrates an alternative way of executing the configuration described with reference to FIG. a. Also in this scenario a new user is added to an input form 200 of a first wizard, wizard A. However, the user having to configure a mailbox for the new user does not have to quit the first wizard before invoking a new one. Instead the user invokes this new wizard, wizard B by activating a new "Add" button 205, which is presented on the input form 200 of wizard A. In response to this step, an input form 206 of wizard B is invoked and presented to the operator about to complete the configuration, as indicated with FIG. 2b. Upon having submitted wizard B, by activating the "Apply" button 208, the input form 200 of wizard A is resumed and displayed to the user, as indicated with FIG. 2c.

However, instead of having to start to fill in the required data for wizard A all over again, the appearance of wizard A has now been updated and customized to comprise any changes made to the invoked wizard that may effect the data settings of wizard. A, and, thus, the operator can choose to confirm the entered data that has been configured in wizard B, and to complete and terminate the configuration procedure, simply by pressing the "Apply" button 209, now on display on the input form.

The logic that specifies which wizard that is to call which other wizard and under which conditions such interruption and invoking of wizards is to be done, will typically be specified either directly in one or more predefined dynamic web pages. These web pages may be e.g. any of Java Server Pages (JSP), Active Server Pages (ASP), Hypertext Pre-processor Pages (PHP), or specifications may be stored on a Common Gateway Interface (CGI). More specifically, rules may be defined in one or more predefined HyperText Markup Language (HTML) tags, such as e.g. Java Standard Tag Library (JSTL) tags. The wizard engine may provide predefined instructions or tags. How these rules are specified will typically be application dependent and in a typical scenario the rules may also depend on the interrelation between different data fields of the respective wizards. By allowing the interrelationships and the appearance of the different input forms of the wizards to be customized in a variety of ways, all according to the respective preferences of the administrator and of the requirements with respect to the respective applications, navigating between different wizards using the suggested navigation mechanism can become very user friendly and self explanatory.

A requirement for invoking another wizard may have different causes, and, thus, a number of different options may be provided upon specifying the rules for interrupting and invoking wizards. As indicated in the previous examples, a required setting or option may be configurable in another wizard by having an activating means, e.g. an "Add" button implemented next to the respective data field of an input form of a wizard. If an option for viewing additional, optional details is required, a viewing function may be implemented e.g. by adding a "View" button to the input form of the wizard, while a function to change an option or to manage a setting may be provided at an input form e.g. by introducing a "Change" or an "Edit" button, respectively.

Depending on whether data settings, entered to different wizards, are mutually dependent or independent, different procedures will be applicable when executing the relevant wizards. When a user is interacting with mutually independent data settings of different wizards, the respective data settings of each wizard may be submitted before an interrupted wizard is resumed, while for a scenario of mutually dependent data settings, each dependent wizard may instead be resumed before the data settings of one or more invoked wizards are submitted, all according to the predefined logic.

Figure 3:
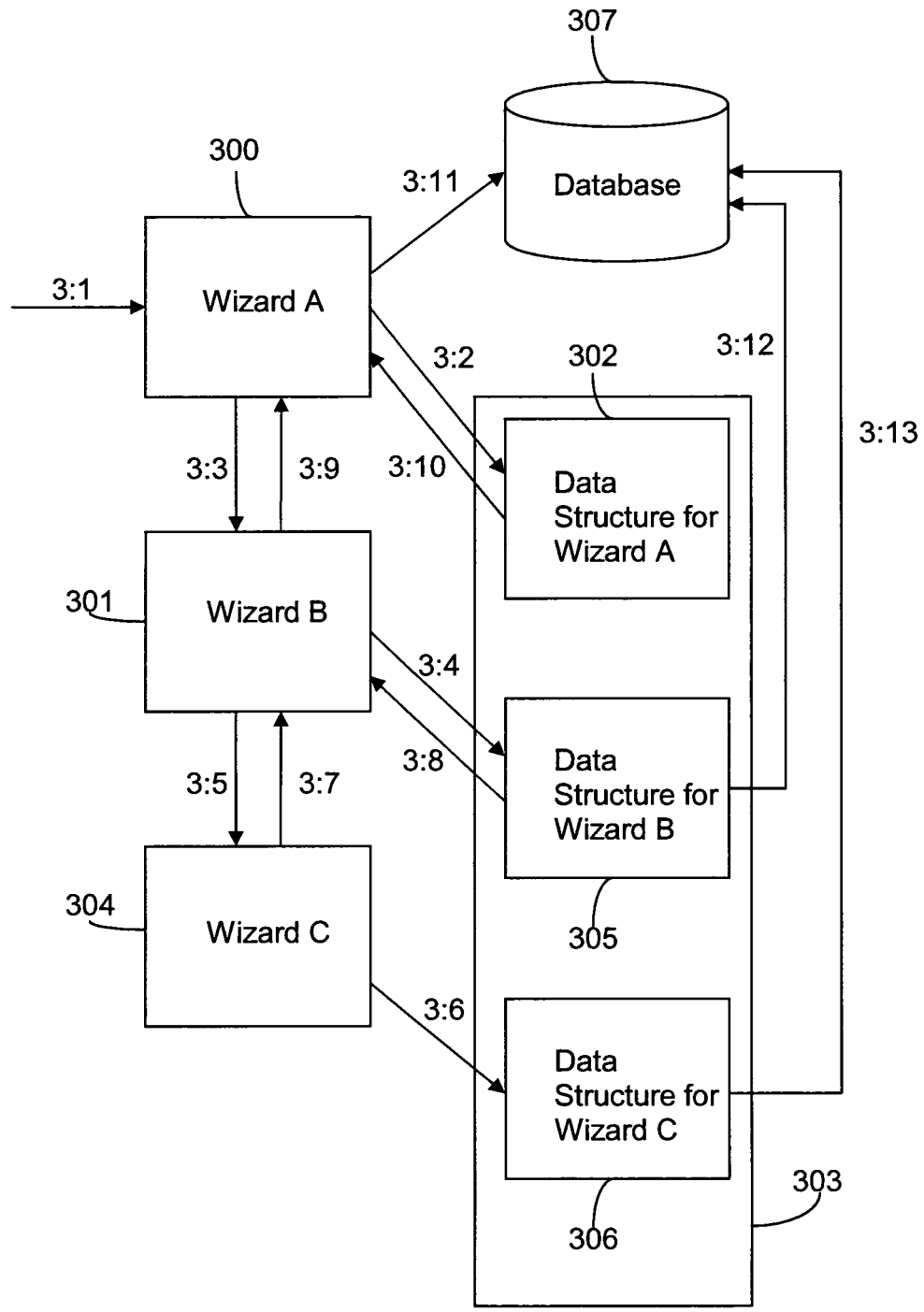
FIG. 3 schematically illustrates a method for executing a web application involving a plurality of wizards, according to one embodiment.

The first of the scenarios mentioned above will now be described in more detail with reference to FIG. 3, illustrating how different wizards may interact during execution of a web application, according to one embodiment.

A user about to execute a web application, such as e.g. to perform a configuration, initially selects to go to an input form of a first wizard, wizard A, 300, as indicated with a first step 3:1. Upon having entered data into a number of data fields, the user is confronted with a data field for which data is required from another wizard, wizard B, 301. Instead of having to quit wizard A 300 in order to be able to call and complete wizard B 301, the user will be able to initiate an interruption of wizard A 300 after which he will be able to continue the configuration procedure by filling in an input form of wizard B 301, by activating such a function from wizard A 300, by activating a predefined button.

As mentioned above all information regarding the states and data that belong to a wizard is normally lost when a different wizard in another context is invoked. The present method, however, keeps this information and enables the user to back trace to previously halted wizards, as well as to restore the previous states and data, once the respective data settings have been set in the invoked wizard and the interrupted wizard is resumed, simply by activating another button.

According to the described mechanism, wizard specific data for the interrupted wizard, comprising the present state and data settings entered to wizard A 300 is therefore stored in a temporary data structure 302 of a web session memory 303, dedicated to wizard A 300, as indicated with another step 3:2, before wizard B 301 is invoked, as illustrated with another step 3:3. The request to invoke wizard B 301 may comprise information which is used for customization of the appearance of wizard B 301, thereby making the options available in the configuration procedure even more user friendly and self explanatory, all according to the current circumstances. Typically, this information depends on some data settings entered to wizard A 300 by the user. Upon having invoked wizard B 301, the user may start to interact with the input form of wizard B 301, e.g. for viewing options and/or adding data accordingly, resting assured that it will be possible to resume wizard A 300 from where wizard A 300 was interrupted when it is time to terminate wizard B 301. If, for example, an option or a data setting of another wizard is missing in the input form of wizard A 300, the user may choose to activate an appropriate button, e.g. an "Add" button next to the respective data field of the present wizard, thereby invoking the other wizard, which, when invoked, is adapted to guide the user through e.g. a configuration of the missing option or setting. In response to activating the Add button, the wizard engine will store the wizard specific data that is associated with the selected option. In a corresponding way a "Remove" button may be configured, if also an option allowing the user to remove data in another wizard is required.

While entering data to or viewing data via wizard B 301 the user may find out that he requires more data that can not be configured in the input form of the present wizard, but in yet another wizard, wizard C 304, all according to one or more options, presented to the user as one or more predefined buttons. In order to be able to continue the configuration accordingly the user therefore may select to interrupt also wizard B 301 and to instead invoke wizard C, simply by pressing another predefined button, visually displayed in the user form of wizard B. In response to this interruption, the wizard specific data of wizard B 301, i.e. the state of, and data entered to, wizard B 301, is stored into another data structure 305 of wizard B 301, as indicated with another step 3:4. In a next step 3:5, wizard C 304 is then invoked via a request, which may also comprise information for customizing the appearance of wizard C 304.

After having completed the necessary configuration steps also in wizard C 304, the user will be able to complete the configuration process by resuming the previous wizards one at a time. Since wizard B 301 depends on the data entered to wizard C 304, the user will not be able to apply the entered data at this stage. Instead the user activates a button enabling the process to continue with the configuration procedure at wizard B 301, where it was previously interrupted. In response to a request to resume to wizard B 301, the data settings inserted to the input form of wizard C 304 are stored in a data structure 306 of wizard C, as indicated with a step 3:6, after which wizard B 301 is resumed, as indicated with another step 3:7. In step 3:7, information may be forwarded to wizard B 301, for customizing wizard B 301, according to any dependent data setting/s made at wizard C 304.

Resuming wizard B 301 comprises the step of recalling the wizard specific data of wizard B 301 from the respective data structure 305, as indicated with a step 3:8. The recalled wizard, i.e. wizard B 301, is now customized and displayed to the user. Once the input form of wizard B has been presented to and accepted by the user, the next step, unless yet another call to another wizard is initiated, is to resume to wizard A 300 in order to be able to terminate the configuration procedure which was originally initiated at wizard A 300. Such a request is indicated with a next step 3:9. Since no changes were made at wizard B, this request will not comprise any customization information at this stage.

Resuming to wizard A 300 comprises a recalling of the wizard specific data of wizard A, that was previously stored in data structure 302 in step 3:2, as indicated with another step 3:10. The user can now continue the configuration procedure in wizard A 300 by filling in any remaining data fields of the input form. If the user approves with the result of the configuration, he can then submit wizard A, typically by activating an "Apply" button. When submitting wizard A, the data settings of wizard A are stored into a database 307, as indicated with a step 3:11 or, alternatively, into a plurality of databases. If successfully stored, also the so far un-submitted data settings entered to wizard B and wizard C are recalled from the respective data structures 305, 306 and stored in database 307, as indicated with subsequent steps 3:12 and 3:13.

The storing of wizard specific data each time a wizard is interrupted is done by putting the current wizard's state and data into a data or object structure of an Array List that is stored in any of the data structures, of the web session memory 307. The invoked wizard is later set up by using the reflection pattern in Java. As indicated above, a separate data structure 302, 305,306, is launched for every new wizard context, i.e. each time a wizard is interrupted and another wizard is called. If yet another wizard is called, the current data structure is updated, and stored into the above mentioned Array List. Each time a user interrupts a wizard and invokes another wizard in order to continue an ongoing web application there, the data entered to the invoked wizard is stored in the data structure, if the user has chosen not to submit the data at this stage.

Figure 4:
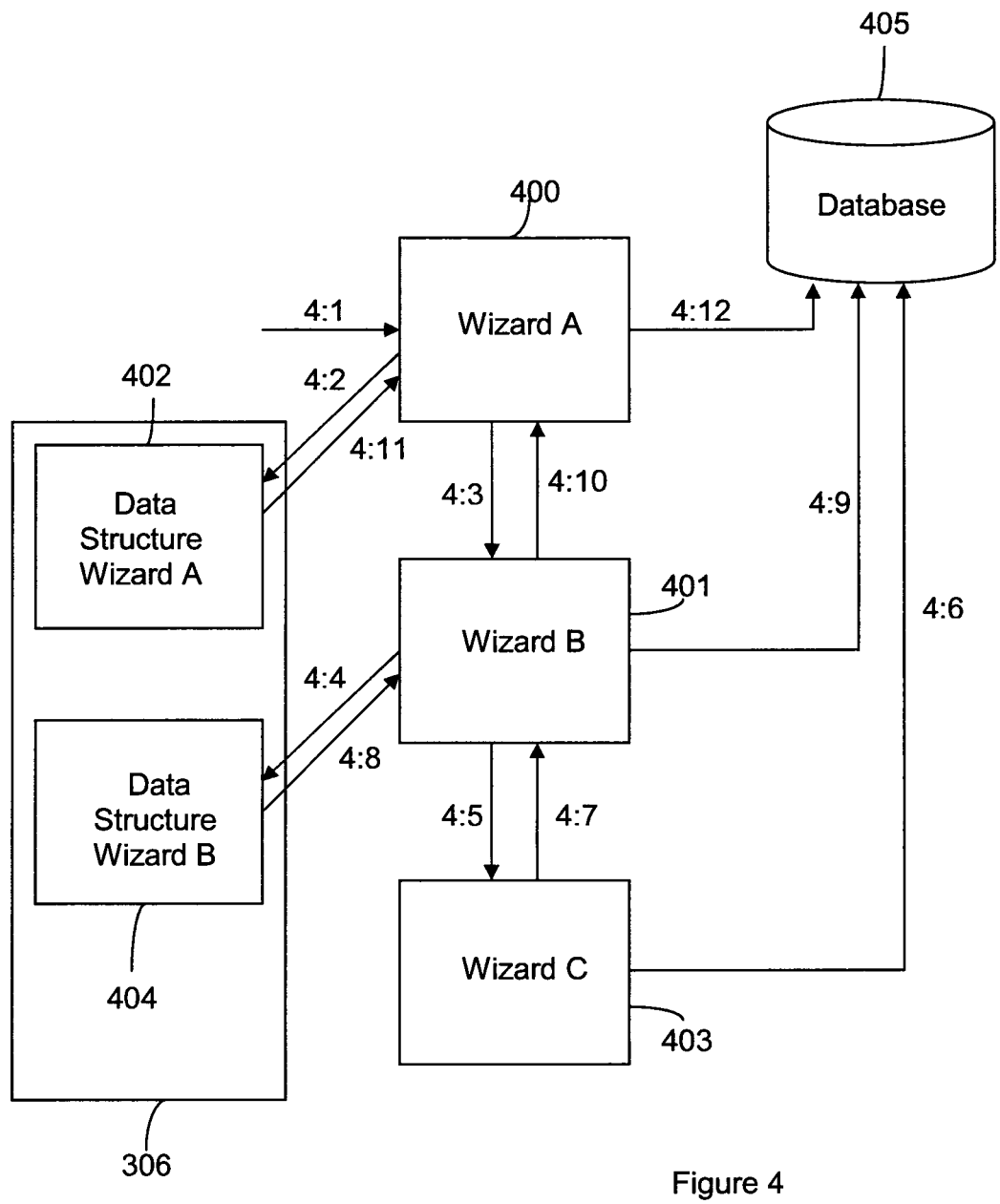
FIG. 4 schematically illustrates a method for executing a web application involving a plurality of wizards, according to another embodiment.

Wizards can also be totally independent. A method according to another embodiment, addressing such an alternative scenario involving independent wizards will now be described with reference to FIG. 4.

In resemblance to the scenario described above, a user having located a configuration site according to this second embodiment initially selects to enter a first wizard, wizard A, 400 in a first step 4:1. About to enter data into wizard A, the user may recognise some configuration step that is not possible to accomplish from wizard A, but which is accessible from another wizard, wizard B 401 that he wishes to complete at this stage. Although not essential for the completion of the data settings of present wizard A 400, i.e. the configuration of wizard B 401 is independent of wizard A, the user invokes wizard B 401 by activating a button dedicated for this purpose, and, thus, the wizard specific data of wizard A 400 is stored in a data structure 402, as indicated with a step 4:2. In a next step 4:3, wizard B 400 is invoked, typically without forwarding any customization data. The user continues by entering data into the input form of wizard B 401. Once the user has completed the required settings of wizard B 401, he may choose to call yet another wizard, wizard C 403, in order to configure some additional data that is also independent of the data settings of the previous wizard, before continuing the configuration procedure at the previous wizards. The user thereby initiates another request, interrupting wizard B 401, whereby the wizard specific data of wizard B is stored in a data structure 404, as indicated with a step 4:4, before invoking wizard C 403, as indicated in a next step 4:5.

Upon having completed the configuration at wizard C 403, the user chooses to terminate this wizard and to resume the previous wizard, wizard B 401. However, since the two wizards are independent, the user may first submit the settings entered to wizard C 403, e.g. by activating an "Apply" button, before leaving wizard C 403, and, thus, the user initiates a procedure for storing the entered data as indicated with a step 4:6, wherein the data is stored into database 405, as indicated in the figure, or alternatively into a plurality of databases.

Once the data settings entered into wizard C 403 has been submitted by the user, wizard B 401 is recalled, as indicated with a step 4:7, and the wizard specific data of wizard B 401 is recalled, as indicated with a next step 4:8. Wizard B 401, is now completed and submitted, with the result that the data entered into the input form of wizard B 401 is also stored in database 405, as indicated with a next step 4:9. At a next stage, the described procedure is repeated also for wizard A 400, wherein wizard A is invoked in another step 4:10, and the wizard specific data of wizard A 400, are restored in a step 4:11. The user can now complete the input form of wizard A 400, and in a subsequent step 4:12, the data settings entered into the input form of wizard A 400 is submitted and stored in database 405, thereby terminating the described configuration process, which originally started with step 4:1.

Although, the two examples presented above comprise three different wizards, which may be called from each other via user activation of buttons pre-configured for this purpose, it is to be understood that the method could instead comprise an arbitrary number of wizards. It is also to be understood, that although the wizards in the two described embodiments are terminated either by submitting a wizard at a time and storing the inserted data when leaving one wizard for a subsequent wizard, or by not submitting a respective wizard until the initial wizard is resumed, i.e. by storing data settings entered into an input form of a wizard in a data structure when interrupting and leaving a wizard, and submitting all interrupted wizards upon terminating the initiated web application, it is to be understood that these two ways of storing data may also be combined during execution of a web application, all according to the rules specified for the web application and the respective wizards involved in the application. These rules may, e.g. depend on the type of data entered into a respective input form of a wizard, or any other predefined application specific conditions, in order to make the web application as user friendly and self explanatory as possible.

As indicated above, the suggested method also allows data entered to an interrupted wizard, as well as to an invoked wizard, to be passed from the interrupted wizard to an invoked wizard, or vice versa, respectively, in order to enable the appearance of the invoked or interrupted wizard to be customized, on the basis of data entered to the interrupted wizard.

The wizard engine keeps the interrupted wizard state and data temporarily stored in a data structure memory, while allowing the user to execute another invoked wizard. During execution of the invoked wizard, the user may choose to interrupt also this wizard and to invoke yet another wizard, where additional data may be viewed and/or entered, before resuming to the interrupted wizard.

The present invention can also be described on the basis of a client/server model. A simplified, exemplary signalling diagram, illustrating the suggested wizard procedure as signalling steps between a client and a server, will therefore now be described according to a first embodiment with reference to FIG. 5*a*, and according to a second embodiment, according to FIG. 5*b*.

Figure 5A:
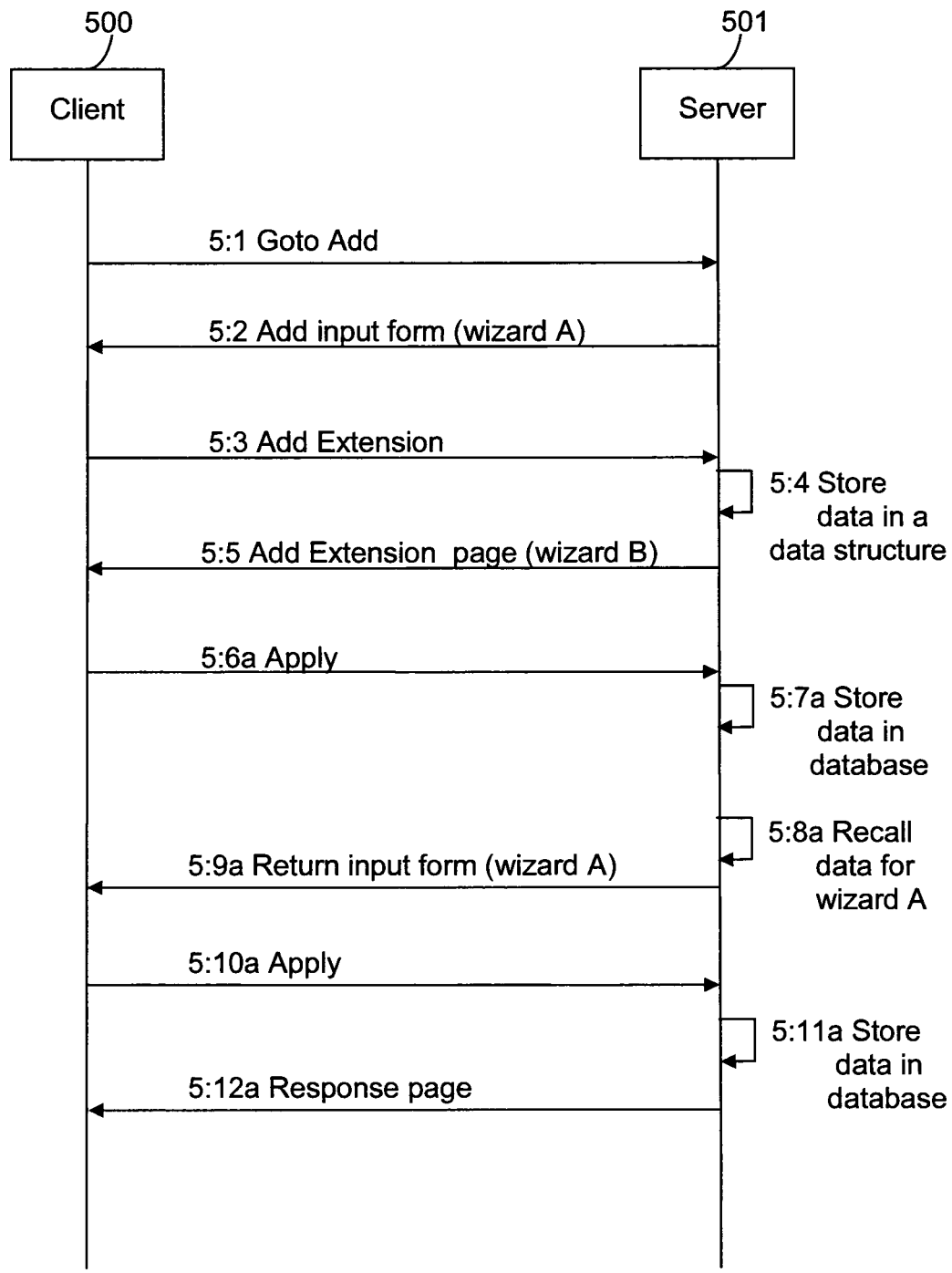
FIG. 5a is a signalling scheme illustrating signalling between a client and a server when executing the method described with reference to FIG. 3.

In FIG. 5*a* a client 500, typically a web browser, such as e.g. Internet explorer or Firefox, requests a server 501, typically an application server, such as e.g. a Java based JSP servlet, to execute a number of independent user tasks of a web application selected by a user. Such a web application can typically comprise the allowing of data configured or entered into an input form of one wizard to be used by one or more other wizards invoked by the user.

A browsing user about to complete a web application first requests for a specific guide, i.e. a wizard, as indicated with a first step 5:1. In response, server 501 activates a first wizard, wizard A, as indicated with a subsequent step 5:2. The user may fill in a number of data fields in a conventional way (not shown), until he is confronted with a field where a required option cannot be executed from the present wizard. Fortunately, the wizard comprises an alternative which allows the user to add additional alternatives provided via another wizard. The user can choose this alternative, typically by activating an "Add" button, resulting in a request which is transmitted in a next step 5:3. The request may comprise information which relates to the data entered to wizard A, which will be used by the server for customizing the appearance of wizard B. The customization typically comprises displaying appropriate buttons for providing suitable alternatives for a user to navigate between different wizards when executing a specific web application.

In response to the request to add data from another wizard, the server 501 stores wizard specific data which will later be used for resuming wizard A, i.e. the present state and data, in a data structure, as indicated with a step 5:4, and in another step 5:5, the server 501 provides an extension page, i.e. wizard B, which may be customized, on the basis of data provided from wizard A, to the client 500. The user can now complete the input form of wizard B, displayed to the user, according to standard procedures (not shown). If no additional wizard is called, i.e. all the options required by the user are available at the present and/or previous wizard/s, the user normally chooses to terminate wizard B at this stage. In this case, the data entered to the input form of wizard B is independent from the data settings previously entered to the input form of wizard A, and, thus, the entered data is submitted, e.g. by activating a "Submit" or "Apply" button from the wizard, as indicated with a next step 5:6*a*.

Server 501 responds to this request by storing the entered data into one or more databases (not shown), as indicated with a subsequent step 5:7*a*. In a next step 5:8*a*, the state and data of wizard A that was previously stored at step 5:4, is recalled, and in another step 5:9*a*, server 501 again provides the input form of wizard A to client 500. This time, however, the appearance of the user form may be different, due to what was entered to wizard B. Once the user has entered the required data settings of the input form of wizard A, he will be able to execute and submit wizard A by activating the "Submit" or "Apply" button also for wizard A, as indicated with a next step 5:10*a*. Wizard A is submitted, wherein data entered to wizard A is stored into one or more databases in a next step 5:11*a* and server 501 provides client 500 with a response page in a final step 5:12*a*.

If, however, data entered to wizard B was compulsory for the settings chosen for wizard A, an alternative signalling scheme could instead be used. Such an alternative signalling diagram will now be illustrated with reference to FIG. 5*b*.

Figure 5B:
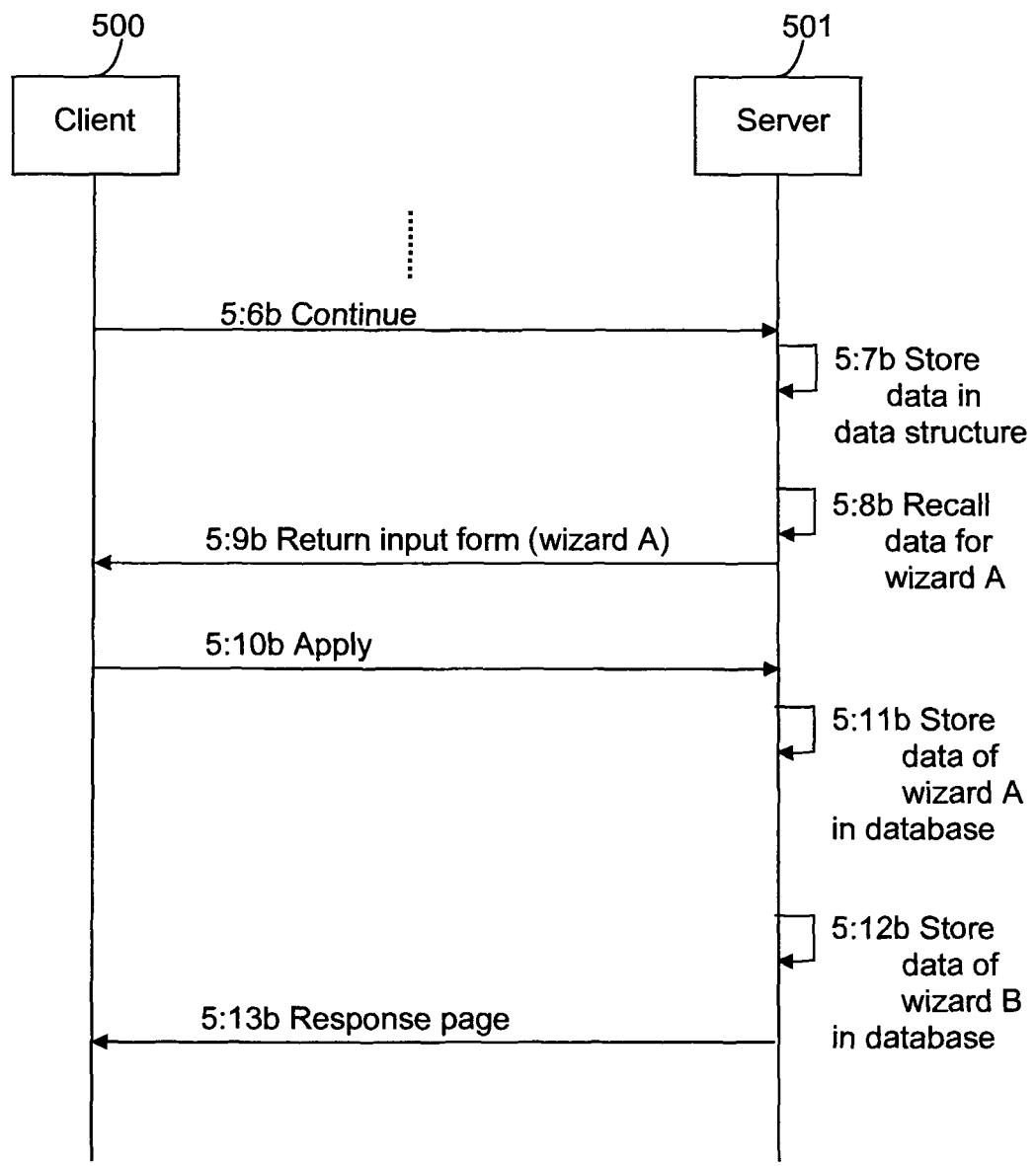
FIG. 5b is a signalling scheme illustrating the signalling between a client and a server when executing the method described with reference to FIG. 4.

According to FIG. 5*b*, upon having received the extension page at step 5:5 of FIG. 5*a*, the user chooses not to submit the entered data. This is achieved by, instead of executing step 5:6*a* of FIG. 5*a*, activating an activating means, typically displayed on the input form of a wizard as a button, which has been pre-configured for this purpose, such as e.g. a "Continue" button, as indicated in a step 5:6*b*. In another step 5:7*b*, the data entered into the input form of wizard B is stored into a data structure of wizard. B, and in step 5:8*b* the state and data of wizard A is recalled. The input form of wizard A is returned to client 500 in step 5:9*b*, and once the user has entered the required data settings into wizard A, he will be able to execute and submit wizard A, typically by activating an "Apply" button, as indicated with step 5:10*b*. In response to this step, server 501 submits and executes wizard A, thereby storing the data of wizard A in at least one database, as indicated with a step 5:11*b*. If successfully submitted, the server 501 continues by submitting and executing wizard B, and also the data of wizard B is stored in at least one database, as indicated with another step 5:12*b*. The result of the completed web application is then provided to client 500 by server 501 in a response page, as indicated with step 5:13*b*.

A wizard engine can be adapted to manage a web application, comprising interrupting ongoing wizards and navigating between different wizards, according to any of the embodiments presented above. By implemented such a wizard engine in an application server, any web application run on that application server may be provided with the suggested navigating mechanism.

Figure 6:
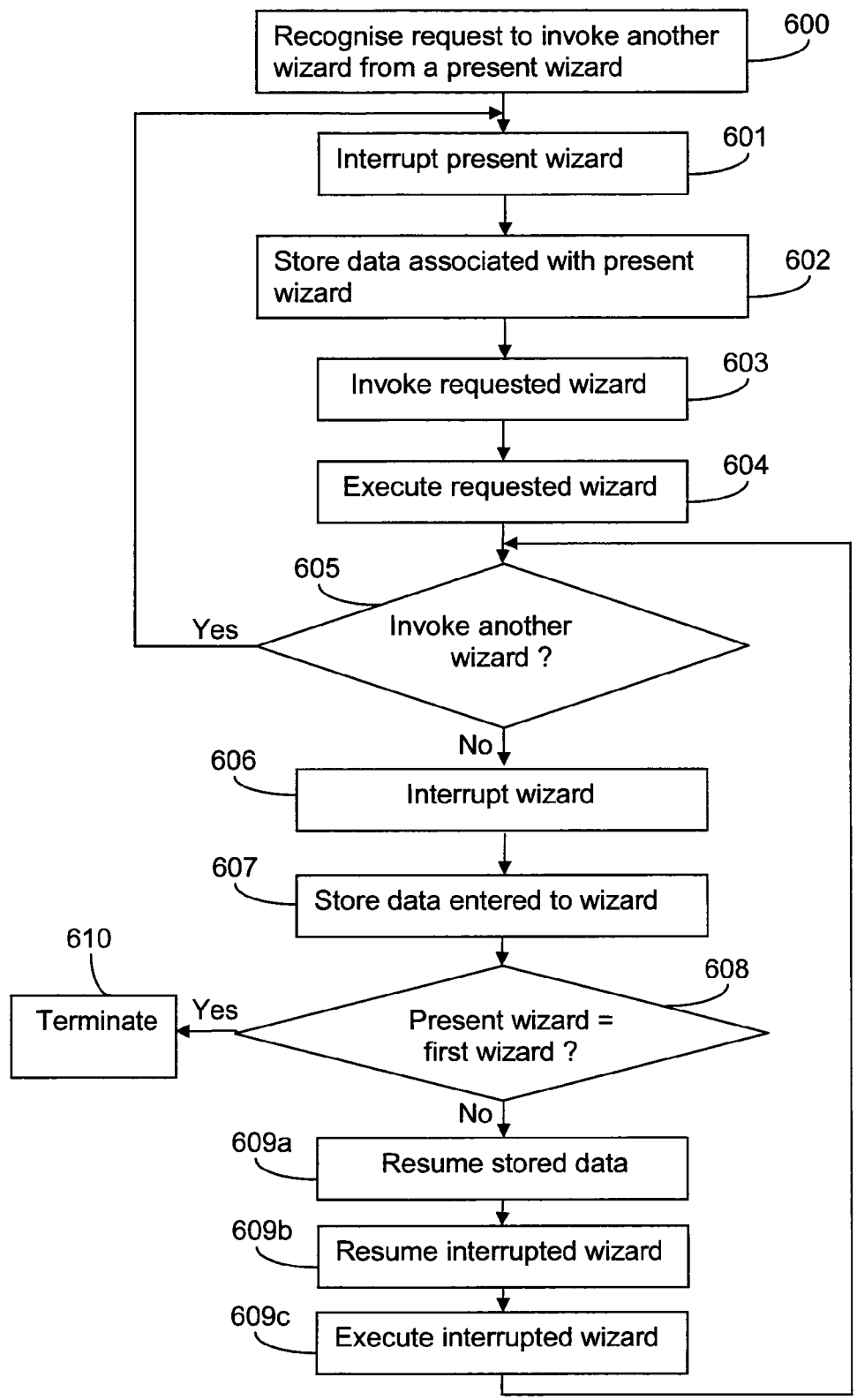
FIG. 6 is a flow chart illustrating a method in a wizard engine for executing a web application involving a plurality of wizards, according to one embodiment.

In FIG. 6, a flow chart illustrates how such a wizard engine of an application server may operate in order to allow a user to complete a web application that relies on at least one user interaction that has to be executed via different wizards.

In a first step 600, the wizard engine recognises a request to invoke another wizard from the wizard which is presently on display that has been entered by the user. In a next step 601, the wizard engine responds by interrupting the present wizard. The interruption, results in that data associated with the present wizard is stored in a data structure of the present wizard as indicated with a next step 602. The wizard engine invokes the requested wizard invoked in another step 603, and in a next step 604, the user starts to execute the requested wizard, e.g. by filling in one or more data fields, and/or by viewing data on the input form of the invoked wizard.

As indicated with another step 605, the user may initiate the invoking of another wizard if data present in this other wizard is required by the present wizard. Any possible way of invoking yet another wizard will be visually presented to the user by one or more buttons, typically located next to the respective data field of the present wizard.

If yet another wizard is invoked by the user, the wizard engine is adapted to repeat the procedure presented above, starting from step 601. If, however, no more wizard is to be invoked from the present wizard, the execution of the present wizard is interrupted as indicated with a step 606, and the data entered to the present wizards input form is stored in a subsequent step 607. As indicated above, the entered data is stored temporary into a data structure if there is a dependency between the respective data fields of two wizards, or permanently into at least one database, if they are mutually independent, typically only one of these alternatives are available to the user.

If, in another step 608, it is determined that the present wizard is the first wizard called for the present task, e.g. no subsequent wizard has been called from the wizard presently activated by the user, the data entered to the present wizard is submitted by the wizard engine in response to the user having activated a button adapted for this purpose, and the task originally initiated by the user in step 600 is then terminated by the wizard engine, as indicated with a next step 610. Prior to terminating the application, any data that has been temporary stored in a data structure, is stored in one or more databases.

If, however, the presently activated wizard is a wizard that has been invoked from another wizard, the data which has previously been temporarily stored in a data structure associated with this other, previously interrupted wizard is instead resumed in another step 609*a*. On the basis of the resumed data, the interrupted wizard is resumed, as indicated with another step 609*b*. Optionally the wizard engine is adapted to customize the interrupted wizard, according to any data entered into the invoked wizard.

In a next step 609*c*, the user will be able to continue to execute the interrupted wizard, from where it was earlier interrupted. The resumed wizard will, however be updated with any changes made in any invoked wizard, which may effect the resumed wizard. Depending on whether a data setting has been applied or not in previous wizards, the respective data setting will typically result in the invoked wizard having a different appearance compared to when it was initially interrupted.

While executing the resumed wizard, the user may choose to invoke yet another wizard, if such an option is available on the input form of the present wizard and if required by the user. As indicated by the flow chart of FIG. 6, wizards may be invoked repeatedly. When a wizard is terminated by storing the entered data, either in at least one database or in a temporary data structure, the most recently interrupted wizard will be invoked and terminated. This procedure is repeated until the wizard originally called by the wizard engine is resumed by the wizard engine. At this stage the application is normally terminated by the wizard engine, by submitting the data entered to the first wizard, and any un-submitted data that has been entered to one or more invoked wizards.

The wizard engine operates in a stateless web environment, and by storing the present state and data of a wizard each time a wizard is interrupted and another wizard is called, the wizard engine will obtain a stateful behaviour for the current workflow of the web application.

Figure 7:
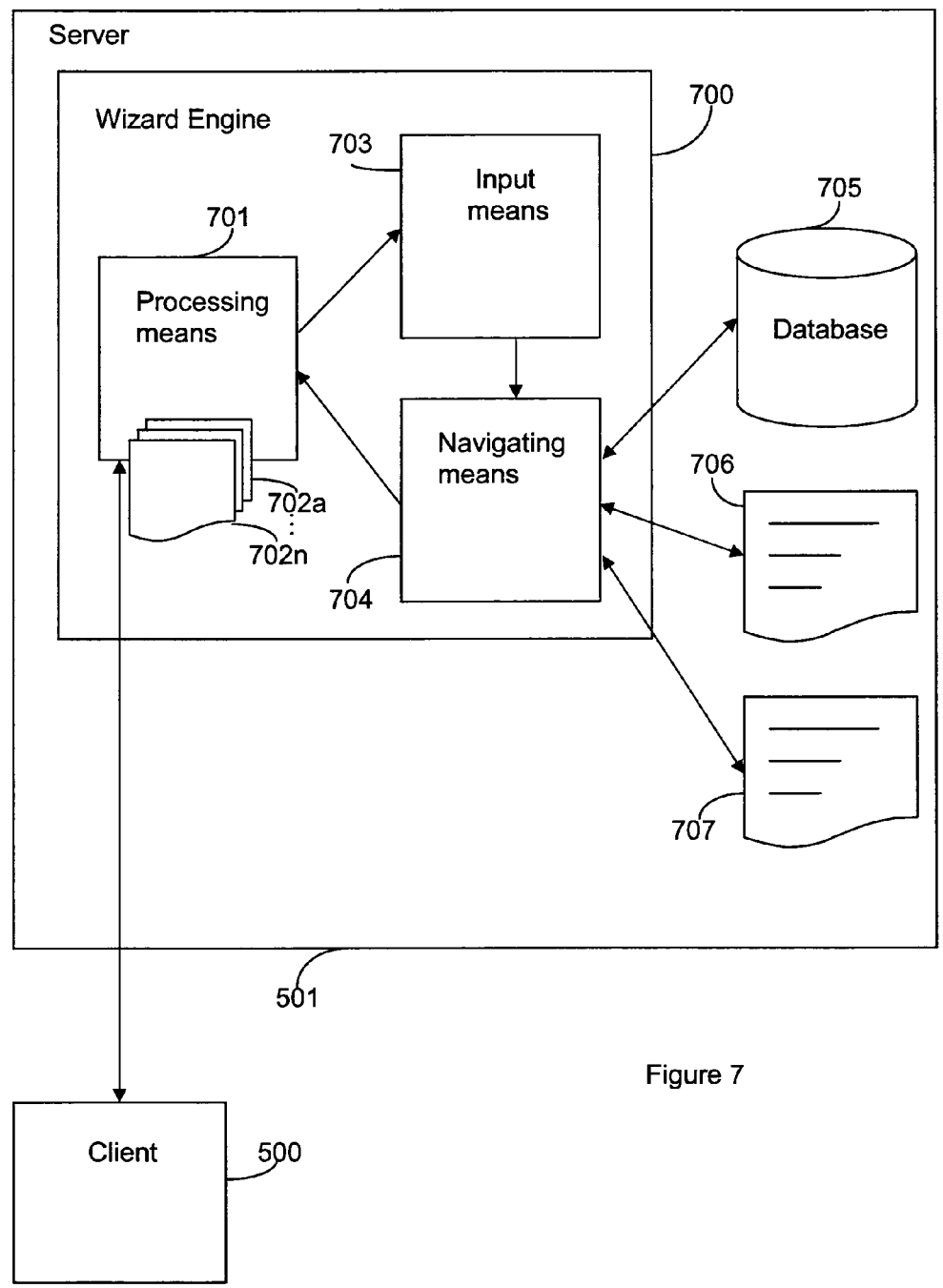
FIG. 7 is a block scheme illustrating a server comprising a Wizard engine adapted to manage the method described with reference to FIG. 6.

A wizard engine can be described as a generic entity of an application server, comprising logic which is adapted to handle transitions between a plurality of wizards, according to any of the embodiments described above. A wizard engine, according to one exemplary embodiment, will now be described in further detail, with reference to FIG. 7.

It is to be understood that the wizard engine presented in the example given below merely represents one possible implementing suggestion, indicating one possible combination of generic means suitable for implementation of the suggested wizard navigating mechanism, and that a wizard engine may be implemented in a plurality of alternative ways, without therefore going beyond the general principles of the claimed invention.

A wizard engine 700, located in a server 501, comprises a processing means 701 which is adapted to process a number of web applications in response to interactions of a user, here represented by client 500. Although not explicitly indicated in the figure, such interaction is executed in conventional manners. Some web applications may have been adapted to enable a user to navigate between two or more wizards 702a-n in accordance with what has been explained above. The processing means is The wizard engine also comprises an input means 703, adapted to recognise requests associated with the navigation between wizards, such as e.g. a request for invoking an ongoing wizard, a request for resuming to an interrupted wizard, and a request for storing data entered to a wizard, in one or more databases or in a data structure. As already mentioned above, these requests are triggered by the user executing the application. A navigating means 704 is adapted to interrupt an ongoing wizard, to store wizard specific data associated with the interrupted wizard and to invoke the relevant wizard in response to the input means 703 having recognised such an invoking request. The navigating means 704 is also adapted to interrupt an invoked wizard, to resume stored data and to resume the respective interrupted wizard in response to the input means 703 having recognised such a resuming request. In response to a request for storing the content of an input form of a wizard, recognised by the input means 703, the navigating means 704 is also adapted to store the respective data in a database 705, or in a data structure 706 associated with the respective wizard. The navigating means 704 also comprises logic for interpreting the requests and for executing the relevant steps, according to preconfigured web application specific rules, typically provided as JSP pages 707.

Consequently, by implementing the suggested wizard engine, a user does not have to quit a present wizard in order to finish an ongoing task. On the contrary it will be possible to start a configuration in the "wrong" order, to halt an ongoing wizard whenever it is found that data is missing, and to step out of the ongoing task in order to complete a missing data setting. Once the missing data setting has been completed, it is possible to return to the originally ongoing task and to complete the initiated configuration task. The suggested wizard in wizard procedure also enables the user to perform such a configuration task in a number of different orders, i.e. to repeatedly move between a number of different wizards, and then to successively return to the previous wizards, in order to complete the task accordingly.

The suggested procedure achieves advantages primarily as to its usability. A user can achieve wanted objectives without having to be fully aware, neither of how to do this, nor in which order to perform such a procedure in advance. A user may start anywhere in the process and the wizard engine will make sure that all configurations are finally executed in the right order. Such a feature may not only save a lot of time for the user, but will also most likely improve the user satisfaction since it will be possible to perceive oneself successfully with an initiated task, even though a process is executing in what, up to now, has been considered to be in the wrong order.

Abbreviations
ASP Active Server Pages
CGI Common Gateway Interface
HTML Hyper Text Markup Language
JSP Java Server Pages
JSTL Java Standard Tag Library
PHP Hypertext Pre-processor Pages
Wizard An input form of fields, or a series of forms that needs to be filled in and submitted to set certain data.

The invention claimed is:

1. A method implemented by a server for managing a web application initiated by a user interacting via a first wizard of the web application, said web application involving at least two wizards, wherein said method comprises:
   upon recognizing a request to access data that is missing from a presently activated wizard at the server and that is accessible from another wizard, interrupting the presently activated wizard, the presently activated wizard thereby becoming an interrupted wizard, and storing data associated with that interrupted wizard,
   invoking said another wizard at the server, enabling said user to continue execution of said web application on said another wizard, said another wizard thereby becoming the presently activated wizard,
   upon recognizing a request to resume a previously interrupted wizard, interrupting the presently activated wizard,
   populating the previously interrupted wizard with new data obtained through the presently activated wizard and resuming stored data associated with said previously interrupted wizard, and
   resuming said previously interrupted wizard with any of the new data and the stored data which affects the previously interrupted wizard, enabling the user to resume execution of said web application on said previously interrupted wizard from the state where it was interrupted.

2. The method according to claim 1, further comprising:
   upon recognizing a request to access data that is missing from said another wizard and that is accessible from yet another wizard, interrupting said another wizard, said another wizard thereby becoming an interrupted wizard, and storing data associated with that interrupted wizard, and
   invoking said yet another wizard, enabling said user to continue execution of said web application on said yet another wizard, said yet another wizard thereby becoming the presently activated wizard;
   obtaining additional data through said yet another wizard; and
   thereafter, resuming said another wizard and populating the another wizard with any of the additional data in combination with the data associated with the another wizard that affects the another wizard.

3. The method according to claim 1, wherein responsive to recognizing a request to resume a previously interrupted wizard, the method further comprises storing data entered to the presently activated wizard.

4. The method according to claim 1, wherein said storing data comprises:
   storing said data in at least one database responsive to the user selecting to submit said data, or
   storing said data in a data structure associated with the presently activated wizard responsive to the user selecting not to submit said data.

5. The method according to claim 1, further comprising terminating said web application responsive to the user activating a terminating request, if the presently activated wizard is the first wizard.

6. The method according to claim 5, further comprising storing previously un-submitted data in one or more databases prior to terminating said web application.

7. The method according to claim 1, further comprising, responsive to the user activating a request to resume a previously interrupted wizard that is not the first wizard:

interrupting the presently activated wizard,
resuming stored data associated with said previously interrupted wizard, and
resuming said previously interrupted wizard, enabling the user to resume execution of said web application on said previously interrupted wizard from the state where it was interrupted.

8. The method according to claim 1, wherein said data associated with a wizard comprises data entered to said wizard at a present state.

9. The method according to claim 1, wherein said request to access missing data or to resume a previously interrupted wizard comprises information for customizing the appearance of the wizard invoked or resumed responsive to said request.

10. The method according to claim 1, wherein any of said requests are activated via an activation button associated with the respective activity and displayed on the presently activated wizard.

11. The method according to claim 10, wherein said activation button is configured to activate any of the following activities:
   adding data on a wizard other than the presently activated wizard,
   viewing data on a wizard other than the presently activated wizard,
   changing data on a wizard other than the presently activated wizard,
   editing data on a wizard other than the presently activated wizard, or
   removing data from a wizard other than the presently activated wizard.

12. A server configured to implement a wizard engine for managing a web application initiated by a user, said web application involving at least two wizards, said wizard engine configured to:
   recognize an invoking request to invoke a requested wizard from a presently activated wizard, a resuming request to resume a previously interrupted wizard, and a storing request to store data associated with a presently activated wizard, and
   interrupt a presently activated wizard, the presently activated wizard thereby becoming an interrupted wizard, store data associated with the interrupted wizard and invoke a requested wizard responsive to recognizing an invoking request, the requested wizard thereby becoming an invoked wizard, interrupt an invoked wizard and store data associated with said invoked wizard, forward the data obtained at the invoked wizard to the previously interrupted wizard and resume stored data associated with said previously interrupted wizard and resume said previously interrupted wizard from the state where it was interrupted using any of the stored data associated with the previously interrupted wizard and the data obtained at the invoked wizard which affects the previously interrupted wizard, and store data responsive to a storing request.

13. The server configured to implement the wizard engine according to claim 12, further configured to invoke another wizard from a presently activated wizard responsive to recognizing a request for accessing data from said another wizard.

14. The server configured to implement the wizard engine according to claim 12, further configured to recognize a submit request to submit data and, responsive to recognizing a resuming request, to store data entered to the presently activated wizard in a data structure if a submit request has not been recognized or to store that data in at least one database if a submit request has been recognized.

15. The server configured to implement the wizard engine according to claim 12, further configured to recognize a terminating request and to terminate said web application responsive to recognizing a terminating request if the presently activated wizard is the first wizard that was activated for the web application.

16. The server configured to implement the wizard engine according to claim 15, further configured to store previously un-submitted data in said at least one database prior to terminating said web application.

17. The server configured to implement the wizard engine according to claim 12, further configured, responsive to recognizing a resuming request to resume a previously interrupted wizard that is not the first wizard that was activated for the web application, to:
   interrupt the presently activated wizard,
   resume stored data associated with said previously interrupted wizard, and
   resume said previously interrupted wizard, enabling the user to resume execution of said web application on said previously interrupted wizard from the state where it was interrupted.

18. The server configured to implement the wizard engine according to claim 12, further configured to customize the appearance of an invoked or a resumed wizard based on data of a respective request.

19. The server configured to implement the wizard engine according to claim 12, further configured to navigate between at least two wizards based on at least one instruction stored in and obtained from a dynamic web page.

20. The server configured to implement the wizard engine according to claim 19, wherein said dynamic web page is any of:
   a Java Server Page (JSP),
   an Active Server Page (ASP),
   a Hypertext Pre-processor Page (PHP), or
   a Common Gateway Interface (CGI).

21. The server configured to implement the wizard engine according to claim 19, wherein said at least one instruction is defined by at least one predefined Hyper Text Markup Language (HTML) tag.

* * * * *

UNITED STATES PATENT AND TRADEMARK OFFICE
CERTIFICATE OF CORRECTION

PATENT NO. : 8,756,526 B2  Page 1 of 1
APPLICATION NO. : 12/997304
DATED : June 17, 2014
INVENTOR(S) : Gador et al.

It is certified that error appears in the above-identified patent and that said Letters Patent is hereby corrected as shown below:

On the Title Page, in Item (75), under "Inventors", in Column 1, Line 1, delete "Robin Gador," and insert -- Robin Marton Gador, --, therefor.

On the Title Page, in Item (75), under "Inventors", in Column 1, Line 2, delete "Varmdo" and insert -- Värmdö --, therefor.

On the Title Page, in Item (75), under "Inventors", in Column 1, Line 3, delete "Jarfalla" and insert -- Järfälla --, therefor.

In the Specification

Figure 1A:
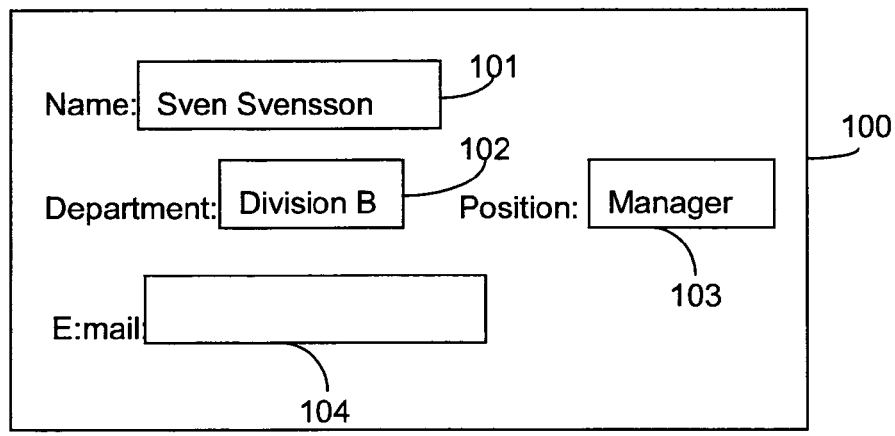
FIG. 1a-c illustrates a simplified configuration example involving two wizards, according to the prior art.
Figure 1B:
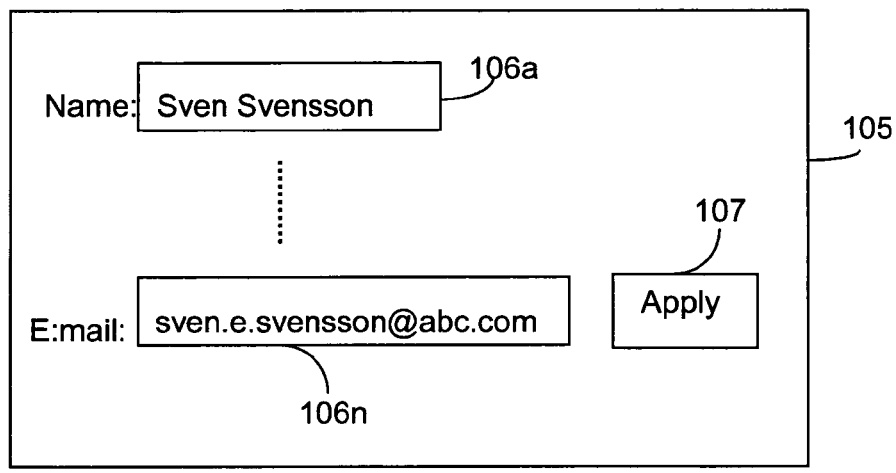
Figure 1C:
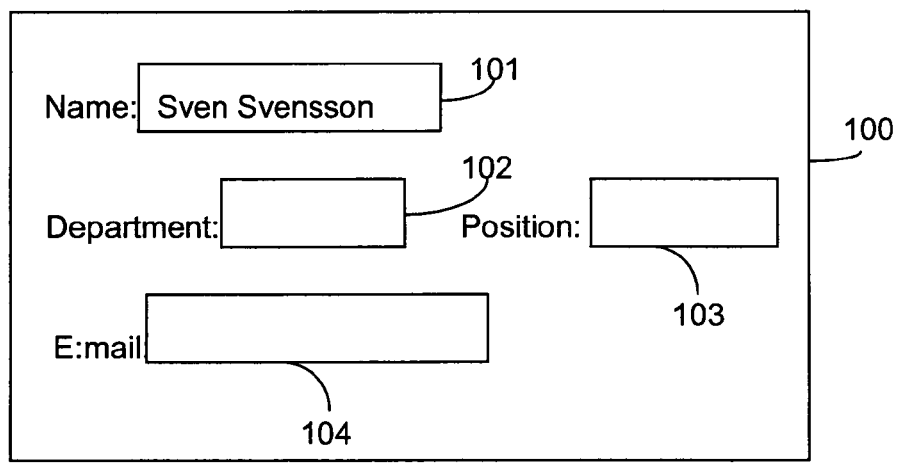

In Column 3, Line 6, delete "FIG. 1a-c illustrates" and insert -- FIGS. 1a-c illustrate --, therefor.

Figure 2B:
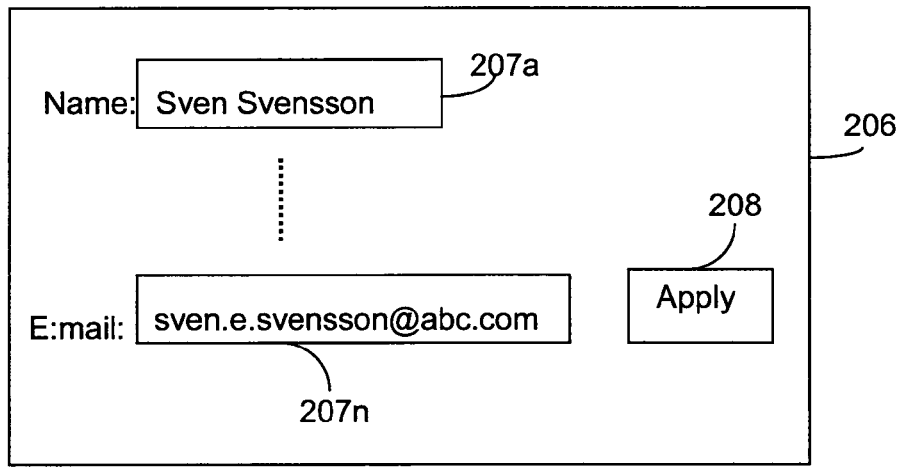
Figure 2C:
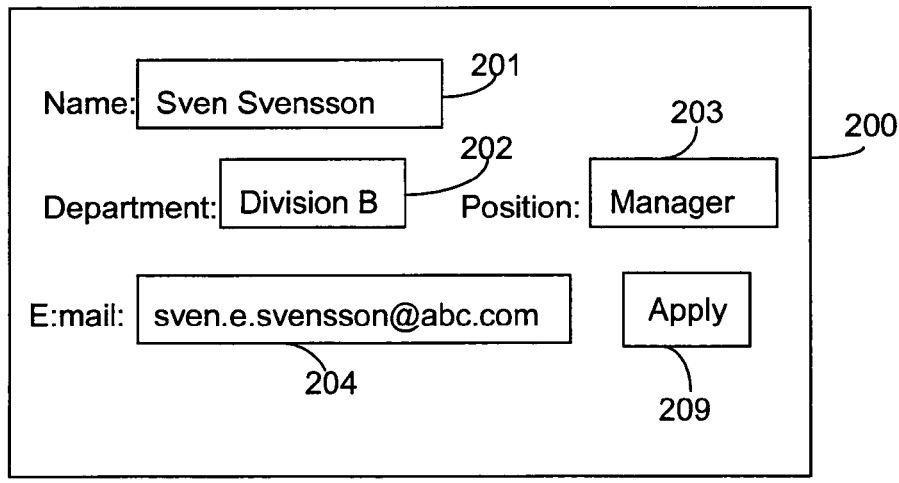

In Column 3, Line 8, delete "FIG. 2a-c illustrates" and insert -- FIGS. 2a-c illustrate --, therefor.

In Column 3, Line 65, delete "FIG. a." and insert -- FIG. 1a. --, therefor.

In Column 4, Line 15, delete "wizard. A," and insert -- wizard A, --, therefor.

In Column 9, Line 21, delete "wizard. B," and insert -- wizard B, --, therefor.

Signed and Sealed this
Twenty-sixth Day of May, 2015

Michelle K. Lee
*Director of the United States Patent and Trademark Office*